United States Patent [19]

Pabst

[11] Patent Number: 4,760,756

[45] Date of Patent: Aug. 2, 1988

[54] COMBINED ENGAGEMENT-DISENGAGEMENT DEVICE FOR TWO SPEED REDUCTION GEARS WITH COAXIAL SHAFTS

[75] Inventor: Otto Pabst, Meransen, Italy

[73] Assignee: Leitner, S.p.A., Bolzano, Italy

[21] Appl. No.: 24,085

[22] Filed: Mar. 10, 1987

[30] Foreign Application Priority Data

Mar. 11, 1986 [IT] Italy .............................. 21191/86[U]

[51] Int. Cl.⁴ ............................................ F16H 37/06
[52] U.S. Cl. ................... 74/665 L; 192/48.8
[58] Field of Search ................ 74/665 L, 665 N; 192/48.8

[56] References Cited

U.S. PATENT DOCUMENTS

| | | | |
|---|---|---|---|
| 990,263 | 4/1911 | Herman | 192/48.8 X |
| 1,743,460 | 1/1930 | Klausmeyer et al. | 192/48.8 X |
| 1,990,810 | 2/1935 | Young | 74/665 L X |
| 2,729,447 | 1/1956 | Groll | 192/48.8 |
| 2,947,397 | 8/1960 | Pietsch | 192/48.8 X |
| 3,303,723 | 2/1967 | Ruf | 192/48.8 |

Primary Examiner—Dirk Wright
Attorney, Agent, or Firm—Oblon, Fisher, Spivak, McClelland & Maier

[57] ABSTRACT

The device comprises two speed reduction gears with coaxial shafts and a fixed support interposed between the reduction gears and housing a first hollow shaft coaxial to the shafts of the gears and in which there is rotatably housed a second independent shaft coaxial to the shafts of the gears. Two pulleys are rotatably mounted on the first hollow shaft and are rigid with toothed flanges which engage frontally in internally splined tubular elements within which sleeves are slidable coaxially but externally to the two shafts. The sleeves are engageable with the shafts and with the tubular elements.

8 Claims, 1 Drawing Sheet

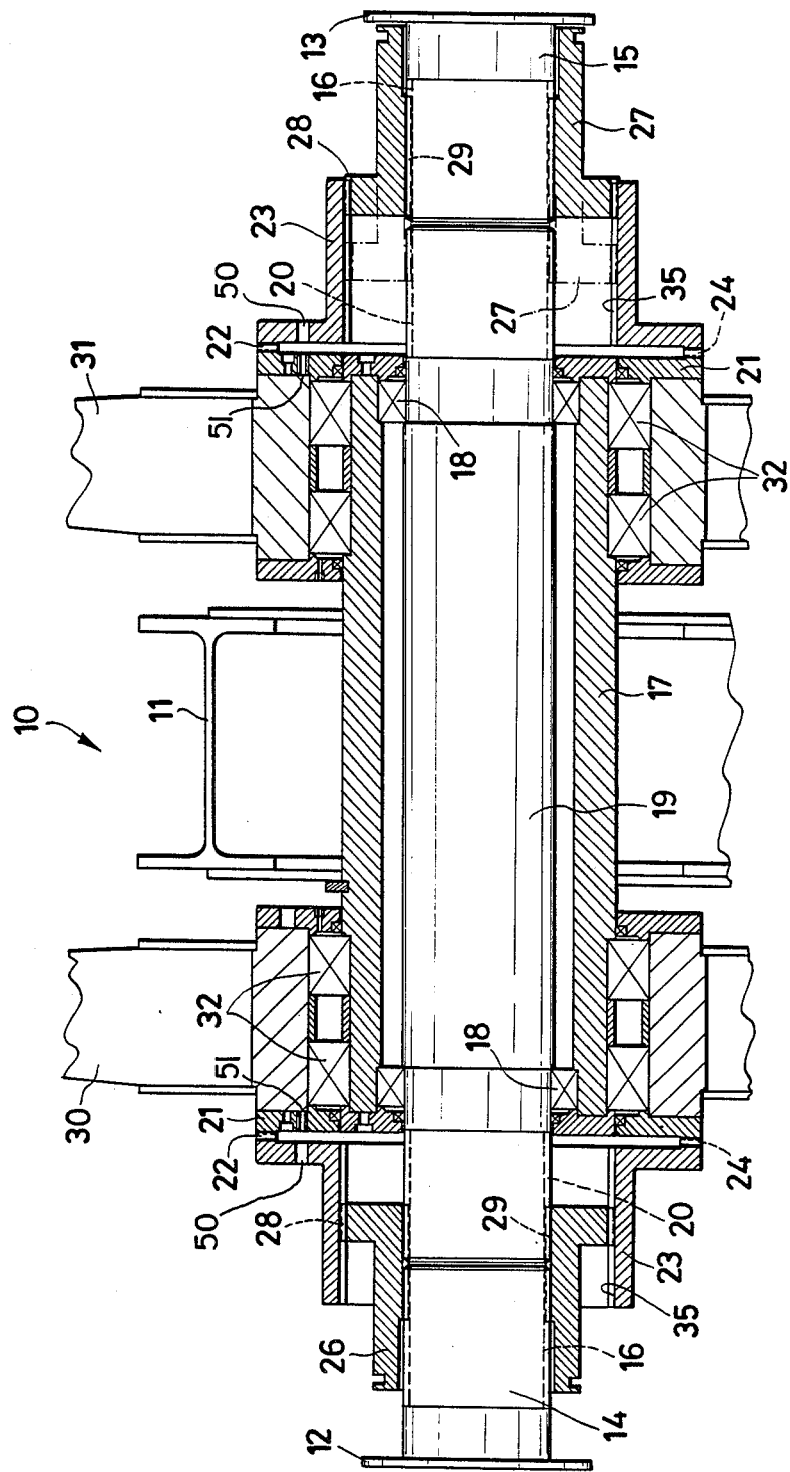

COMBINED ENGAGEMENT-DISENGAGEMENT DEVICE FOR TWO SPEED REDUCTION GEARS WITH COAXIAL SHAFTS

FIELD OF THE INVENTION

This invention relates to a combined engagement-disengagement device for two speed reduction gears with coaxial shafts.

BACKGROUND OF THE INVENTION

In the case of cableways, in particular of the monocable type with automatic gripping, two adjacent cableway sections are currently each provided with one drive winch. Each winch, formed essentially from one or more motors, a speed reduction gear and a drive pulley keyed onto the slow shaft of the reduction gear, operates the cableway section on which it is installed.

It is therefore not possible currently to operate one section with the winch of the other and vice versa, or to use both winches to operate the two drive pulleys at the same time.

OBJECT OF THE INVENTION

The object of the invention is to obviate the aforesaid drawbacks by enabling two adjacent cableway sections, in which the drive pulleys can be rotated together at equal or different speeds or rotated one at a time, to be operated by one or other of the two winches at choice.

SUMMARY OF THE INVENTION

This object is attained by a combined engagement-disengagement device for two speed reduction gears with coaxial shafts, comprising essentially a fixed support interposed between the two reduction gears and housing a first hollow shaft which is coaxial to the shafts of said reduction gears and in which there is rotatably housed a second independent shaft coaxial to the shafts of the reduction gears, there being provided two pulleys rotatably mounted on the first hollow shaft, characterised in that the pulleys are rigid with toothed flanges which engage frontally in internally splined tubular elements within which sleeves slide coaxially but externally to said two shafts of said reduction gears, the sleeves being provided with means for their engagement with the shafts and with the tubular elements.

BRIEF DESCRIPTION OF THE DRAWING

The present invention is described hereinafter with reference to the accompanying drawing, which shows a section through the device according to the present invention.

DETAILED DESCRIPTION OF THE PRESENTLY PREFERRED EMBODIMENT

In the FIGURE, the reference numeral 10 indicates overall the device according to the present invention. The reference numeral 11 indicates a fixed support interposed between two reduction gears 12 and 13 having facing coaxial shafts 14 and 15, the shafts 14 and 15 comprising first splines 16 at their ends.

The support 11 houses a hollow shaft 17 which is coaxial to the shafts 14 and 15 of the reduction gears 12 and 13, but is of greater diameter.

Within the hollow shaft 17 and supported by bearings 18 there is provided a further shaft 19 comprising second splines 20 at its ends and interposed coaxially between the shafts 14 and 15.

Pulleys 30 and 31 are mounted on the hollow shaft 17 by way of bearings 32. The pulleys 30 and 31 are provided with frontally-fixed flanges 21 comprising first toothings 22 and to which flanged tubular elements 23 are coupled by means of second toothings 24 and fixing means received in passage 50, 51 so as to form a frontal-coupling structure. Inside the tubular elements 23 there are provided third splines 35 in which sleeves 26 and 27 slidingly engage by means of third toothings 28. The sleeves 26 and 27, which are coaxial but external to the shafts 14, 15 and 19, are provided internally with fourth toothings 29 slidingly engageable with the first splines 16 and with the second splines 20 provided on the shafts 14 and 15 and on the shafts 19, respectively. Depending on their position, the sleeves 26 and 27, which are slidable within the tubular elements 23, can either rigidly connect the shafts 14 and 15 together by joining them by means of the shaft 19, or disconnect them to make them independent.

The sleeves 26 and 27 also transmit the rotary motion of the shafts 14 and 16 to the respective pulleys 30 and 31 by way of the flanges 21.

Thus with the device according to the present invention, it is possible to operate either one or both of the pulleys 30 and 31, so transmitting motion by means of the reduction gear 12 or reduction gear 13 at choice.

It is also possible to operate both the pulleys 30 and 31 with both reduction gears, so that they rotate at the same speed of rotation. This latter condition occurs when the sleeves 26 and 27 are in intermediate position within the tubular elements 23, so as to rigidly connect the shaft 14 of the reduction gear 12 to the shaft 19 at one end, and the shaft 15 of the reduction gear 13 to the shaft 19 at its other end. The shaft 19 therefore enables the two shafts 14 and 15 of the reduction gears 12 and 13 to rotate at the same angular speed, the motion being transmitted to the pulleys 30 and 31 by way of the connections between the sleeves 26 and 27, the tubular elements 23 and the flanges 21.

Alternatively, if the reduction gear 13 requires maintenance or develops faults, the pulley 31 can be operated by the reduction gear 12, by leaving the sleeve 26 in an intermediate position within the tubular element 23 but moving the sleeve 27 into an abutting position inside its tubular element, so as to disconnect the shaft 19 from the shaft 15 of the reduction gear 13 but in any event leaving the connection between the shaft 19 and pulley 31 unaltered. Thus in this operating state, the motion of the shaft 14 is transmitted not only to the pulley 30 but also to the pulley 31 by way of the shaft 19 connected to the sleeve 27. If only the pulley 30 is to be operated, it is necessary only to extract the sleeve 27 from the tubular element 23 until the shaft 19 no longer engages the sleeve 27, so that the rotary motion is not transmitted to the pulley 31. In this operating state, the sleeve 26 can be disposed either in an intermediate position within the tubular element 23 or in its extracted position, at choice.

As the device according to the present invention is symmetrical, the previously described conditions can be applied to either side at choice, as either the reduction gear 12 or the reduction gear 13 can be used for operating purposes. Obviously, the motors which operate the reduction gears must be sized so that they can operate both pulleys at the scheduled speed when under the most severe load conditions, this being done by merely over-dimensioning the motors.

The present invention has been described by way of non-limiting example, but modifications and changes can be made thereto by experts of the art without leaving the scope of protection of the present patent.

I claim:

1. A combined engagement-disengagement device for two speed reduction gears with coaxial shifts, said device comprising a fixed support interposed between said two speed reduction gears and housing a first hollow shaft which is coaxial to said shafts of said speed reduction gears and in which there is rotatably housed a second independent shaft coaxial to said shafts of said speed reduction gears, there being provided two pulleys rotatably mounted on said first hollow shaft, characterized in that said pulleys are rigid with toothed flanges which engage frontally in internally splined tubular elements within which sleeves slide coaxially but externally to said two shafts of said speed reduction gears, said sleeves being provided with means for their engagement with said shafts and with said tubular elements.

2. A device as claimed in claim 1, characterised in that said means for the engagement of said sleeve with said two shafts and with said tubular element comprise toothings provided internally and externally.

3. A device as claimed in claim 1, characterised in that said second independent shaft is interposed between said two shafts of said speed reduction gears and said sleeves.

4. A device as claimed in claim 1, characterised in that bearings are provided between said hollow shaft and said independent second shaft in proximity to the ends of said second shaft.

5. A device as claimed in claim 4, characterised in that said tubular elements are flanged tubular elements.

6. A device as claimed in claim 1, characterised in that said sleeves and said flanges form a frontal coupling when mutually engaged.

7. Apparatus for transmitting power, said apparatus comprising:

(a) a first speed reduction gear mounted on a first shaft, said first shaft having a first external spline;
(b) a second speed reduction gear mounted on a second shaft, said second shaft having a second external spline and being coaxial to said first shaft;
(c) a fixed support interposed between said first and second speed reduction gears;
(d) a third shaft housed in said fixed support, said third shaft being hollow and coaxial to said first shaft;
(e) a fourth shaft rotatably housed in said third shaft, said fourth shaft being coaxial to said first shaft, abutting said first shaft at a first end, having an external diameter at least approximately equal to the external diameter of said first shaft at its first end, having a third external spline at its first end, abutting said second shaft at a second end, having an external diameter at least approximately equal to the external diameter of said second shaft at its second end, and having a fourth external spline at its second end;
(f) a first pulley rotatably mounted on said third shaft on the side of said fixed support adjacent to said first speed reduction gear;
(g) a second pulley rotatably mounted on said third shaft on the side of said fixed support adjacent to said second speed reduction gear;
(h) a first tubular element solid with said first pulley, said first tubular element having a first internal spline;
(i) a second tubular element solid with said second pulley, said second tubular element having a second internal spline;
(j) a first sleeve that slides in said first internal spline and on said first and third external splines; and
(k) a second sleeve that slides in said second internal spline and on said second and fourth external splines.

8. Apparatus for transmitting power as recited in claim 7 wherein:

(a) said first tubular element projects from said first pulley towards first speed reduction gear and
(g) said second tubular elements projects from said second pulley towards second speed reduction.

* * * * *